United States Patent
Utasi

(10) Patent No.: US 12,554,982 B2
(45) Date of Patent: Feb. 17, 2026

(54) METHOD FOR TRAINING A NEURAL NETWORK

(71) Applicant: Continental Autonomous Mobility Germany GmbH, Ingolstadt (DE)

(72) Inventor: Akos Utasi, Göd (HU)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 713 days.

(21) Appl. No.: 17/815,075

(22) Filed: Jul. 26, 2022

(65) Prior Publication Data

US 2023/0035069 A1 Feb. 2, 2023

(30) Foreign Application Priority Data

Jul. 27, 2021 (EP) ...................................... 21187958

(51) Int. Cl.
*G06N 3/08* (2023.01)
*G06N 3/048* (2023.01)

(52) U.S. Cl.
CPC ............... *G06N 3/08* (2013.01); *G06N 3/048* (2023.01)

(58) Field of Classification Search
CPC .......... G06N 3/08; G06N 3/048; G06N 3/084; G06N 20/00; G06N 3/045; G06N 3/047;
(Continued)

(56) References Cited

U.S. PATENT DOCUMENTS 11,651,230 B2 * 5/2023 Li ........................... G06V 20/64
726/25
2018/0225564 A1 8/2018 Haiut
(Continued)

FOREIGN PATENT DOCUMENTS

BR 112019027609 B1 1/2025
CN 107122825 A 9/2017
(Continued)

OTHER PUBLICATIONS

European Search Report dated Feb. 1, 2022 for the counterpart European Patent Application No. 21187958.0.
(Continued)

*Primary Examiner* — Shyue Jiunn Hwa
(74) *Attorney, Agent, or Firm* — Buchanan Ingersoll & Rooney P.C

(57) ABSTRACT

The disclosure relates to training an artificial neural network, including providing a neural network for training, wherein after training the neural network is operated using a first activation function. An initial training of the neural network is executed based on a second activation function which is different from the first activation function and which is a parametrized activation function including at least one parameter to be changed which is chosen such that the second activation function is equal or essentially equal to the first activation function. The initial training is performed using a start parameter setup being chosen such that the second activation function differs from the first activation function. In a transition phase, further training steps are executed in which the at least one parameter is changed such that the second activation function approaches the first activation function. A final training step is executed using the first activation function.

14 Claims, 2 Drawing Sheets

(58) Field of Classification Search
CPC ............ G06N 3/04; G06N 3/044; G06N 7/01; G06N 3/09; G06N 3/0455; G06N 3/0464; G06N 3/096; G06F 17/12; G06F 17/11; G06F 30/20; G06F 7/58; G16H 20/40; G16H 50/30; H04B 17/373; H04B 17/3911; H04B 17/3912; H04L 27/0008; H04L 5/0048; G06T 7/11; G06T 7/60; G06T 7/70

See application file for complete search history.

(56) References Cited

U.S. PATENT DOCUMENTS

| | | | |
|---|---|---|---|
| 2019/0114531 A1* | 4/2019 | Torkamani | G16H 50/30 |
| 2019/0139622 A1* | 5/2019 | Osthege | G16B 5/20 |
| 2020/0343985 A1* | 10/2020 | O'Shea | G06N 20/00 |
| 2021/0142171 A1* | 5/2021 | Jung | G06N 3/048 |
| 2021/0232091 A1 | 7/2021 | Hong et al. | |
| 2021/0248473 A1 | 8/2021 | Shazeer | |
| 2021/0370993 A1 | 12/2021 | Qian et al. | |
| 2022/0138562 A1* | 5/2022 | Biryukova | G06F 17/12 706/15 |
| 2023/0035615 A1 | 2/2023 | Utasi | |
| 2023/0394304 A1* | 12/2023 | Zhu | G06N 3/08 |

FOREIGN PATENT DOCUMENTS

| | | |
|---|---|---|
| CN | 107516128 A | 12/2017 |
| CN | 108388941 A | 8/2018 |
| CN | 112906866 A | 6/2021 |
| CN | 115700604 A | 2/2023 |

OTHER PUBLICATIONS

Garrett Bingham et al: "Discovering Parametric Activation Functions", arxiv.org, Cornell University Library, 201 Olin Library Cornell University Ithaca, NY 14853, Jan. 30, 2021 (Jan. 30, 2021), XP081870742.

Shuanglong Liu et al: "Optimizing Fully Spectral Convolutional Neural Networks on FPGA", 2020 International Conference on Field-Programmable Technology (ICFPT), IEEE, Dec. 9, 2020 (Dec. 9, 2020), pp. 39-47, XP033910218.

Samba Raju Chiluveru et al: "Efficient Hardware Implementation of DNN-Based Speech Enhancement Algorithm With Precise Sigmoid Activation Function", IEEE Transactions on Circuits and Systems II: Express Briefs, IEEE, USA, vol. 68, No. 11, May 25, 2021 (May 25, 2021), pp. 3461-3465, XP011885608.

Arijit Nadai, et al: "Improving the Performance of Neural Networks with an Ensemble of Activation Functions", 2020 International Joint Conference on Neural Networks (IJCNN), Sep. 28, 2020.

Kumar Shridhar, et al: "A Probabilistic Activation Function for Deep Neural Networks" arXiv:1905.10761v2 [cs. _G], https://doi.org/10.48550/arXiv.1905.10761.

Prajit Ramachandran, et al: "Searching for Activation Functions", arXiv:1710.05941v2 [cs.NE], https://doi.org/10.48550/arXiv.1710.05941.

Jinhyeok Jang et al: "Neural Networks with Activation Networks", arXiv:1811.08618v1 [cs.CV].

Mark Harmon et al: "Activation Ensembles for Deep Neural Networks", arXiv:1702.07790 [stat.ML], https://arxiv.org/pdf/1702.07790.

Diganta Misra: "Mish: A Self Regularized Non-Monotonic Activation Function", arXiv:1908.08681 [cs.LG], https://doi.org/10.48550/arXiv.1908.08681.

Hendrycks et al. "Gaussian Error Linear Units (GELUs)", 2016.

Clevrt et al. "Fast and Accurate Deep Network Learning by Exponential Linear Units" (ELUs), ICLR 2016.

Dugas et al. "Incorporating Second-Order Functional Knowledge for Better Option Pricing", Proceedings of the 13th International Conference on Neural Information Processing Systems, 2000.

Jie Renlong et al: "Regularized Flexible Activation Function Combination for Deep Neural Networks", 2020 25th International Conference on Pattern Recognition (ICPR), IEEE, Jan. 10, 2021 (Jan. 10, 2021), pp. 2001-2008, XP033908448, DOI: 10.1109/ICPR48806.2021.9412370.

Brosnan Yuen et al: "Universal Activation Function For Machine Learning", arxiv.org, Cornell University Library, 201 Olin Library Cornell University Ithaca, NY 14853, Nov. 7, 2020 (Nov. 7, 2020), XP081808784.

Zhang Yichi et al, "FracBNN: Accurate and FPGA-Efficient Binary Neural Networks with Fractional Activations" , THE 2021 ACM/SIGDA International Symposium on Field-Programmable Gate Arrays, ACMPUB27, New York, NY, USA, Feb. 17, 2021 (Feb. 17, 2021), pp. 171-182, XP058563339.

Nair et al., "Rectified Linear Units Improve Restricted Boltzmann Machines," ICML '10: Proceedings of the 27 International Conference on International Conference on Machine Learning, Jun. 2010, pp. 807-814.

Tianhe Yu et al., "Gradient Surgery for Multi-Task Learning," arXiv:2001.067824v4, Dec. 22, 2020.

Chen et al, "Just Pick a Sign: Optimizing Deep Multitask Models with Gradient Sign Dropout," 34th Conf. on Neural Information Processing Systems, 2020.

Manessi et al., "Learning Combination of Activation Functions", 2018 24th International Conference on Pattern Recognition (ICPR), Beijing, (Apr. 25, 2019), pp. 61-66.

Oostwal, "Phase Transitions in Layered Neural Networks: The Role of the Activation Function", University of Groningen, (Dec. 2020). (46 pages).

Extended European Search Report issued Feb. 4, 2022, by the European Patent Office in European Patent Application No. 21187954.9-1203. (9 pages).

Office Action issued by the U.S. Patent and Trademark Office in the U.S. Appl. No. 17/815,025, mailed May 30, 2025, U.S. Patent and Trademark Office, Alexandria, VA. (35 pages).

Notice of Allowance issued by the U.S. Patent and Trademark Office in the U.S. Appl. No. 17/815,025, mailed Oct. 21, 2025, U.S. Patent and Trademark Office, Alexandria, VA. (13 pages).

Gulcehre et al., "Mollifying Networks", arXiv: 1608.04980v1 [cs.LG] (Aug. 17, 2016), pp. 1-11.

Office Action (The First Office Action) issued Nov. 4, 2025, by the State Intellectual Property Office of People's Republic of China in Chinese Patent Application No. 202210863417.5 and an English translation of the Office Action. (26 pages).

Office Action (The First Office Action) issued Nov. 14, 2025, by the State Intellectual Property Office of People's Republic of China in corresponding Chinese Patent Application No. 202210859174.8 and an English translation of the Office Action. (17 pages).

\* cited by examiner

METHOD FOR TRAINING A NEURAL NETWORK

CROSS REFERENCE TO RELATED APPLICATION

The present application claims the benefit of or priority to EP application 21187958.0, filed Jul. 27, 2021, the content of which is incorporated by reference herein.

TECHNICAL FIELD

The present invention relates generally to the field of artificial neural networks. More specifically, the invention relates to a method for training a convolutional neural network by using multiple different activation functions.

BACKGROUND

Deep learning and neural networks are currently the state-of-the-art machine learning solutions for various tasks in many different input domains, including visual, audio, time series data. Activation functions are typically used to introduce non-linearity into the neural network.

Currently, the most popular activation is the rectified linear unit (ReLU) activation, which is defined as y=max (0,x), i.e. clipping the negative values of the input to zero. There are other variants of ReLU, for example ReLU6 clips the value at maximum of 6.

Most modern GPU/TPU/CPU chips give hardware support to compute different popular activation functions efficiently. However, in embedded systems the number of supported activations is very limited (typically only ReLU or its variant is supported). On the other hand, these activations usually have inferior performance as compared to networks using state-of-the-art activation functions proposed recently (e.g., GELU, ELU, Swish, Mish, etc.). Unfortunately, the hardware support for these state-of-the-art activation functions is very limited and is completely missing for embedded chips.

Therefore, neural networks using state-of-the-art activation functions cannot be efficiently executed on most embedded systems since these activation functions are not supported by the hardware, because in most cases, only some ReLU-variants are supported.

SUMMARY

It is an objective of the embodiments of the present invention to disclose a method for training a neural network which provides, as a training result, a high-efficient neural network even in case of target hardware which only provides hardware support for a limited number of activation functions.

The objective is addressed by the features of the independent claims. Example embodiments are given in the dependent claims. If not explicitly indicated otherwise, embodiments of the present disclosure may be freely combined with each other.

According to an aspect, the present disclosure refers to a method for training an artificial neural network. The method includes the following steps.

First, a neural network to be trained is provided. After training, the neural network is operated based on a first activation function. In other words, in a production phase, the neural network uses a first activation function for introducing non-linearity into the neural network. In the production phase, the neural network is operated based on an embedded hardware, in the following referred to as target hardware, which provides hardware support for the first activation function.

An initial training of the neural network is executed based on a second activation function. The second activation function is different to the first activation function. The second activation function is a parametrized activation function comprising at least one parameter to be changed, wherein the at least one parameter of the second activation function may be chosen such that the second activation function is equal or essentially equal to the first activation function. However, initial training is performed using a start parameter setup. The start parameter setup is chosen such that the second activation function differs from the first activation function.

After performing initial training, further training is performed in a transition phase. In the transition phase, further training steps are executed, wherein in consecutive training steps, the at least one parameter of the second activation function is changed such that the second activation function approaches the first activation function. In other words, during transition phase, the parameter setup of the second activation function is tuned such that the second activation function increasingly develops towards the first activation function.

Finally, a final training step is executed based on the first activation function.

The proposed training method is advantageous because due to using a state-of-the-art activation function for neural network training at the beginning and changing the activation function towards another activation function for which is hardware support by the target hardware is available, an improved training result and therefore higher efficiency of the trained neural network may be obtained. It is worth mentioning, that from the target hardware's point of view, this performance improvement comes for free, because only the model training is affected, but the network structure remains unchanged.

The proposed method may be used for training neural networks for image processing tasks in automotive applications. Beside the most common deep learning tasks like object detection, lane detection and semantic segmentation, the proposed method may also be used for training neural networks for other 2D image processing tasks, like mono-camera based depth estimation, surface normal estimation, keypoint detection for, e.g., human pose estimation, etc.

According to an example embodiment, in the transition phase, the at least one parameter is adapted from the start parameter setup to an end parameter setup. The start parameter setup may be chosen such that the second activation function is significantly different from the first activation function. The start parameter setup may be, for example, a standard parameter which is typically for the second activation function. In case of a Swish activation function, for example, the start parameter setup may be $\beta=1$. The end parameter setup may be chosen such that the second activation function essentially meets the first activation function. For a Swish activation function, for example, the end parameter setup may be $\beta=30$ or higher.

According to an example embodiment, the at least one parameter is nonlinearly adapted from the start parameter setup to the end parameter setup. For example, at the beginning of the transition phase, the step width of the changed parameter may be smaller than at the end of the transition phase. Thereby, the training efficiency may be improved.

According to an example embodiment, a scheduler dynamically adapts the at least one parameter such that the second activation function is adapted towards the first activation function. The scheduler may be an entity configured to automatically perform the adaption of the at least one parameter to be changed. The scheduler may include an interface for outputting the parameter. The interface may be coupled with the training environment in which the training of the neural network is performed. Thereby, an automated adaption of the parameter setup of the second activation function is obtained.

According to an example embodiment, the dynamic adaption function, based on which the scheduler adapts the at least one parameter of the second activation function, is determined based on a hyperparameter search method. Experiments have shown that the adjustment function, i.e., the way how the at least one parameter of the second activation function is adapted, has significant effect on the efficiency of the trained neural network. Based on a hyperparameter search method, it is possible to determine the course of adjustment which leads to optimal or essentially optimal training results.

According to an example embodiment, the first activation function is a RELU activation function which is described by the following formula:

$y(x)=\max(0,x)$.

Alternatively, the first activation function may be a variant of a RELU activation function, for example a RELU activation function with a certain quantization (e.g. RELU6, RELU8 etc.) or leaky/parametric RELU activation function.

According to an example embodiment, the second activation function is selected out of the list of the following activation functions: Swish, Mish, GELU, ELU. The activation functions may be parametrized such that, by selecting a parameter of the second activation function appropriately, the second activation function approaches the first activation function.

According to an example embodiment, the second activation function is a Swish activation function which is described by the following formula:

$y(x)=x \cdot \text{sigmoid}(\beta \cdot x)$.

Thereby $\beta$ is the parameter which may be changed such that the Swish activation function approaches a RELU activation function.

According to an example embodiment, the second activation function is a Mish activation function which is described by the following formula:

$y(x)=x \cdot \tan h(\text{softplus}(\beta \cdot x))$;

wherein $\text{softplus}(x)=\ln(1+e^x)$.

Thereby $\beta$ is the parameter which may be changed such that the Mish activation function approaches a RELU activation function.

Regarding softplus-function reference is made to the following document: Dugas et al. Incorporating Second-Order Functional Knowledge for Better Option Pricing, Proceedings of the 13th International Conference on Neural Information Processing Systems, 2000.

According to an example embodiment, the second activation function is a GELU activation function which is described by the following formula:

$y(x)=x \cdot P(X \leq x)=x \cdot \frac{1}{2} \cdot (1+\text{erf}(\beta \cdot x/\sqrt{2}))$.

Thereby $\beta$ is the parameter which may be changed such that the GELU activation function approaches a RELU activation function.

According to an example embodiment, the second activation function is an ELU activation function which is described by the following formula:

$$y(x,a) = \begin{cases} x & x > 0 \\ \beta \cdot (e^x - 1) & x \leq 0 \end{cases}$$

Thereby $\beta$ is the parameter which may be changed such that the ELU activation function approaches the RELU activation function.

According to an example embodiment, a training environment used for training the neural network includes a computational hardware different to a production hardware used in a production phase. For training the neural network, a training environment may be used which provides hardware support for more activation functions than the production hardware, specifically embedded hardware used in automotive applications. The extended capabilities of training environment may be used for determining improved weighting factors of the neural network by using state-of-the-art activation functions.

According to an example embodiment, the training environment includes hardware support for a Swish, Mish, GELU and/or ELU activation function and the production hardware includes hardware support for a RELU activation function but not for a Swish, Mish, GELU and/or ELU activation function. Thereby, it is possible to use the Swish, Mish, GELU and/or ELU activation function at the beginning of the training and adapt the activation functions gradually towards the RELU activation function in order to determine a trained neural network with a higher efficiency than training the neural network solely based on the RELU activation function.

According to a further aspect, the present disclosure relates to a computer program for training an artificial neural network. The computer program includes instructions which, when the program is executed by a computer, cause the computer to carry out the steps of:

receiving information regarding a neural network to be trained, after training the neural network to be operated based on a first activation function;

executing an initial training of the neural network based on a second activation function, wherein the second activation function is different from the first activation function, the second activation function being a parametrized activation function including at least one parameter to be changed, wherein the at least one parameter of the second activation function may be chosen such that the second activation function is equal or essentially equal to the first activation function, wherein the initial training is performed using a start parameter setup, the start parameter setup being chosen such that the second activation function differs from the first activation function;

executing a transition training phase with further training steps, wherein in consecutive training steps of the transition training phase, the at least one parameter of the second activation function is changed such that the second activation function approaches the first activation function; and executing a final training step based on the first activation function.

The term "vehicle" as used in the present disclosure may refer to a car, truck, bus, train or any other crafts.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
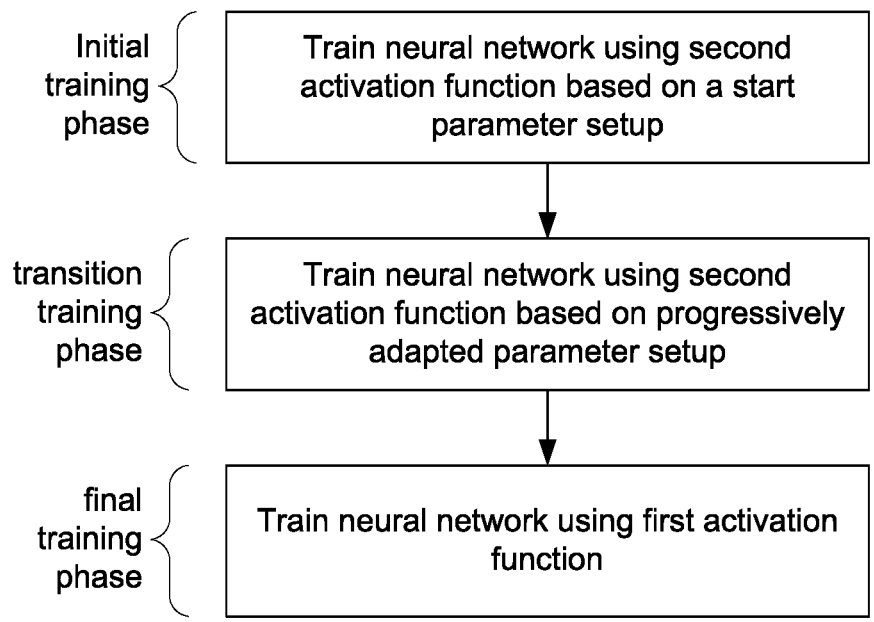
FIG. 1 shows a schematic diagram of a training strategy for training a neural network.

The present disclosure will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present disclosure disclosed in the specification, the claims, examples and/or the figures may both separately and in any combination thereof be material for realizing the invention in various forms thereof.

FIG. 1 shows a block diagram illustrating the basic training procedure for providing an improved training of a neural network which has to be operated on a target hardware in production phase which provides no hardware support for state-of-the-art activation functions like Swish, Mish, GELU, ELU.

It is worth mentioning that the computational hardware used for training the neural network is different from the computational hardware on which the neural network is executed during production phase, in the following referred to as target hardware. As such, the situation occurs that the computational hardware used for training the neural network comprises hardware support for multiple different activation functions like Swish, Mish, GELU, ELU and/or RELU, whereas the target hardware includes only a limited hardware support for a certain activation function, e.g., a RELU activation function. The target hardware is, for example, an embedded computational system for automotive applications.

As shown in FIG. 1, the training is split in multiple training phases, namely an initial training phase, a transition training phase and a final training phase. The goal of such split training is to use at the beginning of the training a second activation function for which in target hardware no hardware support is available, progressively adapt the second activation function towards a first activation function by adjusting at least one parameter of the parametrized second activation function and finally train the neural network based on the first activation function for which hardware support is available on the target hardware.

More in detail, in the first training phase, the neural network is trained based on a second parametrized activation function with a start parameter setup. The second activation function is different from the first activation function for which hardware support exists on the target hardware. However, the parametrization of the second activation function allows a modification of the second activation function towards the first activation function, i.e., by changing the parameter setup of the second activation function, the second activation function approaches the first activation function. A certain selection of parameter setup allows that the second activation function is equal or essentially equal to the first activation function.

In the initial training phase, the start parameter setup is chosen such that the transfer function of the second activation function is different to the transfer function of the first activation function.

In the transition phase, the parameter setup of the second activation function is progressively adapted such that the transfer function of the second activation function approaches the transfer function of the first activation function. More in detail, in the transition phase multiple training steps are performed successively. The training steps include different parameter setups, wherein the parameter setup of subsequent steps is chosen such that the transfer function of the second activation function becomes increasingly similar to the transfer function of the first activation function. Thereby a smooth transition between the training with the second and first activation functions is obtained.

In the final training phase, the neural network is trained using the first activation function. The final training may be performed either based on the first activation function or based on the second activation function which parameter setup is chosen such that the transfer function of the second activation function is equal to the transfer function of the first activation function.

Figure 2:
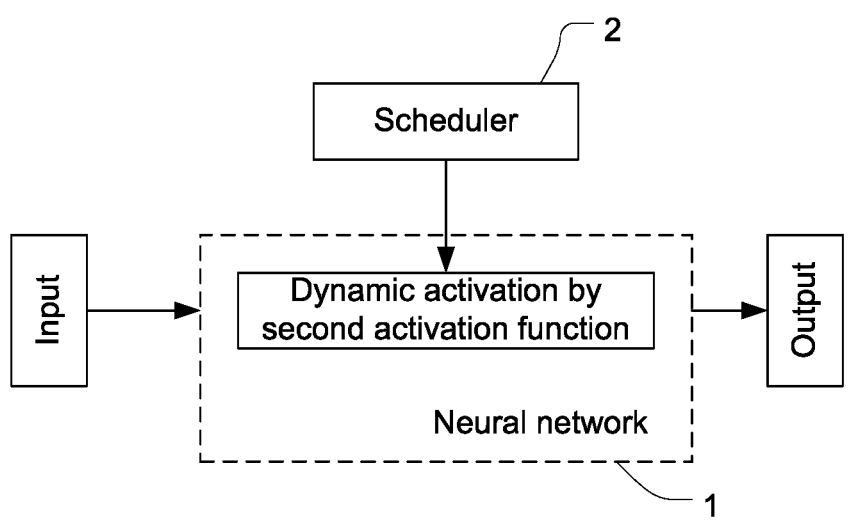
FIG. 2 schematically illustrates a training environment for training the neural network based on a scheduler which handles parameter adaption.

FIG. 2 shows a schematic block diagram of a training environment for training the neural network 1. The neural network 1 implements a parametrized second activation function. Due to the parametrization, the transfer function of the second activation function may be dynamically adjusted in order to achieve dynamic activation.

In order to change the parameter setup of the second activation function, the training environment includes a scheduler 2. The scheduler 2 is configured to change the parameter setup of the second activation function such that the transfer function of the second activation function approaches the transfer function of the first activation function.

In a first embodiment, the at least one parameter is nonlinearly adapted from the start parameter setup to an end parameter setup. More specifically, the nonlinear adaption is implemented by a stepwise change of the at least one parameter of the parameter setup, wherein the step width of parameter change between subsequent steps increases or decreases nonlinearly.

According to another embodiment, the at least one parameter is changed linearly from start parameter setup to the end parameter setup.

The first activation function might be a RELU activation function (RELU: Rectified Linear Unit) which is defined by the following formula:

$$y(x) = \max(0, x) \tag{Formula 1}$$

RELU activation function is widely supported by common embedded hardware, specifically embedded hardware for automotive applications.

Regarding RELU activation function, reference is made to the following document: Nair and Hinton, Rectified Linear Units Improve Restricted Boltzmann Machines, ICML 2010.

In the following, possible example implementations of second activation functions are provided. For example, the second activation function might be one of the following activation functions:

Swish (Ramachandran et al. Searching for Activation Functions, ICLR 2018);
Mish (Misra, Mish: A Self Regularized Non-Monotonic Activation Function, BMVC 2020);
GELU (GELU: Gaussian Error Linear Unit) (Hendrycks et al. Gaussian Error Linear Units (GELUs), 2016);
ELU (ELU: Error Linear Unit) (Clevert et al. Fast and Accurate Deep Network Learning by Exponential Linear Units (ELUs), ICLR 2016).

The above-mentioned activation functions are parametrizable activation functions. By an appropriate selection of at least one parameter of the activation functions, the transfer function of the activation functions may be transferred to RELU-activation function.

The Swish activation function may be described by the following formula:

$$y(x)=x\cdot\text{sigmoid}(\beta\cdot x) \quad \text{(Formula 2)}.$$

By selecting $\beta\to\infty$, the transfer function of Swish activation function is equivalent to the RELU activation function. As such, the scheduler 2 might increase $\beta$ during the transition training phase. Thereby, the second activation function approaches the first activation function.

The Mish activation function may be described by the following formula:

$$y(x)=x\cdot\tan h(\text{softplus}(\beta\cdot x)) \quad \text{(Formula 3)}$$

wherein softplus(x)=ln(1+$e^x$).

By selecting $\beta\to\infty$, the transfer function of the Mish activation function is equivalent to the RELU activation function. As such, the scheduler 2 might increase $\beta$ during the transition training phase. Thereby, the second activation function approaches the first activation function.

The GELU activation function may be described by the following formula:

$$y(x)=x\cdot P(X\leq x)=x\cdot \tfrac{1}{2}\cdot(1+\text{erf}(\beta\cdot x/\sqrt{2})) \quad \text{(Formula 4)}$$

wherein erf is the Gaussian error function.

By selecting $\beta\to\infty$, the transfer function of GELU activation function is equivalent to the RELU activation function. As such, the scheduler 2 might increase $\beta$ during the transition training phase. Thereby, the second activation function approaches the first activation function.

Finally, the ELU activation function may be described by the following formula:

$$y(x,a)=\begin{cases} x & x>0 \\ \beta\cdot(e^x-1) & x\leq 0 \end{cases}$$

By selecting $\beta=0$, the transfer function of ELU activation function is equivalent to the RELU activation function. As such, the scheduler might decrease $\beta$ during the transition training phase. Thereby, the second activation function approaches the first activation function.

Figure 3:
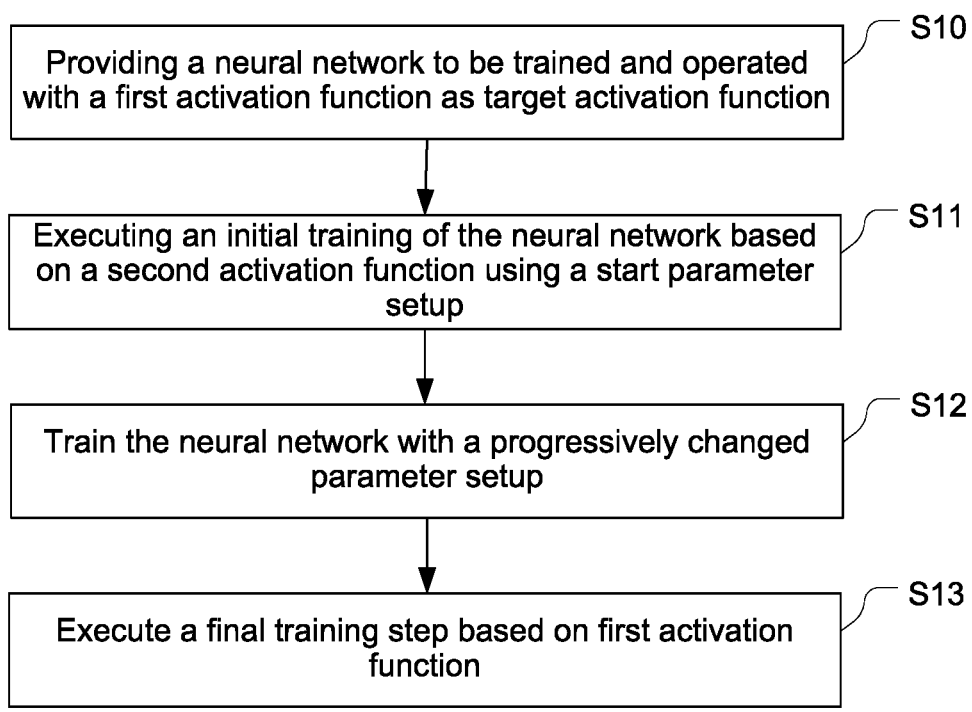
FIG. 3 shows a schematic block diagram illustrating the steps of a method for training a neural network based on first and second activation function.

FIG. 3 shows a flow diagram illustrating the steps of a method for training an artificial neural network.

First, a neural network to be trained is provided which should be operated based on a first activation function on target hardware (S10).

Subsequently, an initial training of the neural network is executed based on a second activation function (S11). The second activation function is different to the first activation function. The second activation function is a parametrized activation function including at least one parameter to be changed. The at least one parameter of the second activation function may be chosen such that the second activation function is equal or essentially equal to the first activation function. The initial training is performed using a start parameter setup which is chosen such that the second activation function differs from the first activation function.

After execution of initial training, further training of neural network is performed in a transition phase. In the transition phase, further training steps are executed, wherein in consecutive training steps, the at least one parameter of the second activation function is changed such that the second activation function approaches the first activation function (S12).

Finally, a final training step is executed based on the first activation function (S13).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 neural network
2 scheduler

The invention claimed is:

1. A method for training an artificial neural network, the method comprising:
providing a neural network to be trained, wherein after training the neural network is to be operated based on a first activation function;
executing an initial training of the neural network based on a second activation function, the second activation function being different from the first activation function, the second activation function being a parametrized activation function comprising at least one parameter to be changed, wherein the initial training is performed using a start parameter setup, the start parameter setup being chosen so that the second activation function differs from the first activation function;
executing further training steps in a transition phase, wherein in consecutive training steps of the transition phase, the at least one parameter of the second activation function is changed so that the second activation function approaches the first activation function until the second activation function is equal to the first activation function; and
executing a final training step based on the first activation function, the final training step being the last step of training the artificial neural network before the neural network is operated based on the first activation function.

2. The method according to claim 1, wherein in the transition phase, the at least one parameter is adapted from the start parameter setup to an end parameter setup.

3. The method according to claim 2, wherein the at least one parameter is nonlinearly adapted from the start parameter setup to the end parameter setup.

4. The method according to claim 1, wherein a scheduler dynamically adapts the at least one parameter so that the second activation function is adapted towards the first activation function.

5. The method according to claim 4, wherein how the scheduler adapts the at least one parameter of the second activation function is determined based on a hyperparameter search method.

6. The method according to claim 1, wherein the first activation function is a rectified linear unit (RELU) activation function which is described by the formula $$y(x)=\max(0,x).$$

7. The method according to claim 1, wherein the second activation function is selected out of the list of the following activation functions: Swish, Mish, gaussian-error linear unit (GELU), exponential linear unit (ELU).

8. The method according to claim 1, wherein the second activation function is a Swish activation function which is described by the formula $$y(x)=x \cdot \mathrm{sigmoid}(\beta \cdot x).$$

9. The method according to claim 1, wherein the second activation function is a Mish activation function which is described by the formula $$y(x)=x \cdot \tanh(\mathrm{softplus}(B \cdot x)),$$

wherein $\mathrm{softplus}(x)=\ln(1+e^x)$.

10. The method according to claim 1, wherein the second activation function is a gaussian-error linear unit (GELU) activation function which is described by the formula, $$y(x) = x \cdot P(X \le x) = x \cdot \frac{1}{2} \cdot \left(1 + \mathrm{erf}\left(\beta \cdot x/\sqrt{2}\right)\right).$$

11. The method according to claim 1, wherein the second activation function is an exponential linear unit (ELU) activation function which is described by the formula $$y(x, a) = \begin{cases} x & x > 0 \\ \beta \cdot (e^x - 1) & x \le 0 \end{cases}.$$

12. The method according to claim 1, wherein a training environment used for training the neural network comprises computational hardware different to a production hardware used in a production phase.

13. The method according to claim 12, wherein the training environment comprises hardware support for a Swish, Mish, gaussian-error linear unit (GELU) or exponential linear unit (ELU) activation function and the production hardware comprises hardware support for rectified linear unit (RELU) activation function but not for a Swish, Mish, GELU and/or ELU activation function.

14. A computer program for training an artificial neural network comprising instructions which, when the program is executed by a computer, cause the computer to carry out:
   receiving information regarding a neural network to be trained, wherein after training the neural network is to be operated based on a first activation function;
   executing an initial training of the neural network based on a second activation function, wherein the second activation function is different to the first activation function, the second activation function being a parametrized activation function comprising at least one parameter to be changed, wherein the initial training is performed using a start parameter setup, the start parameter setup being chosen so that the second activation function differs from the first activation function;
   executing a transition training phase with further training steps, wherein in consecutive training steps of the transition training phase, the at least one parameter of the second activation function is changed so that the second activation function approaches the first activation function until the second activation function is equal to the first activation function; and
   executing a final training step based on the first activation function, the final training step being the last step of training the artificial neural network before the neural network is operated based on the first activation function.

* * * * *